Nov. 9, 1943.  C. SADOWSKY  2,333,678
AIRPLANE SPOTTER
Filed Sept. 7, 1942  3 Sheets-Sheet 1

INVENTOR
CHARLES SADOWSKY
BY
ATTORNEYS

Nov. 9, 1943.     C. SADOWSKY     2,333,678
AIRPLANE SPOTTER
Filed Sept. 7, 1942     3 Sheets-Sheet 2
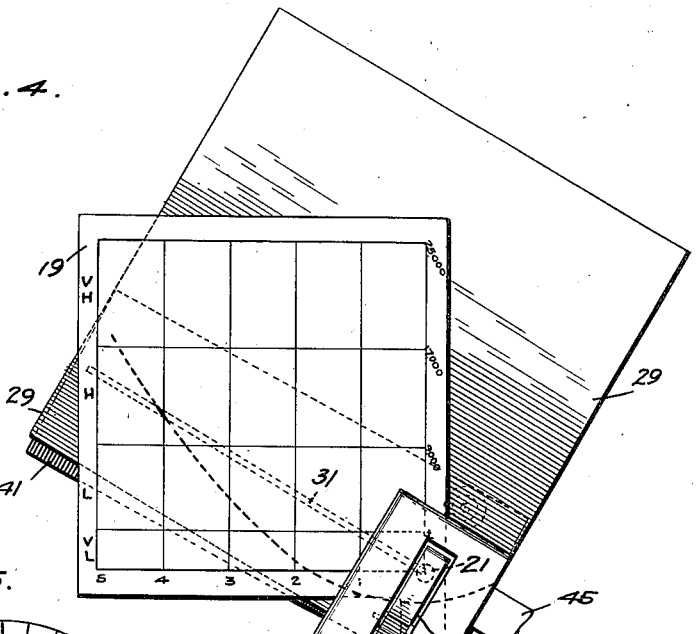
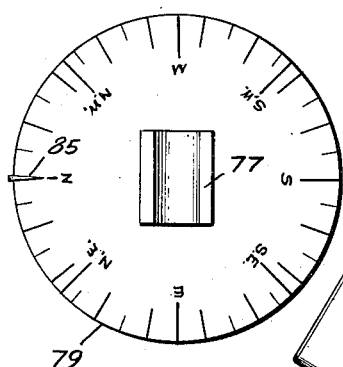
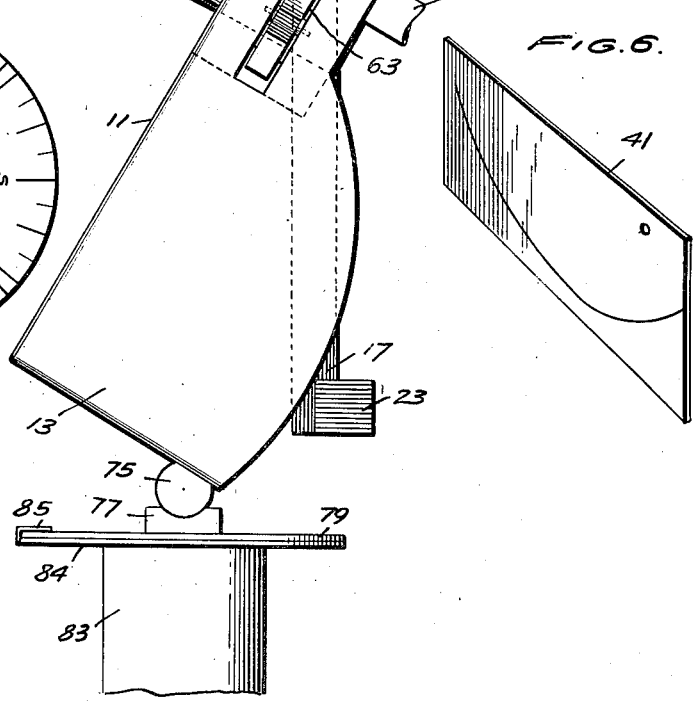
INVENTOR
CHARLES SADOWSKY Nov. 9, 1943.    C. SADOWSKY    2,333,678
AIRPLANE SPOTTER
Filed Sept. 7, 1942    3 Sheets-Sheet 3
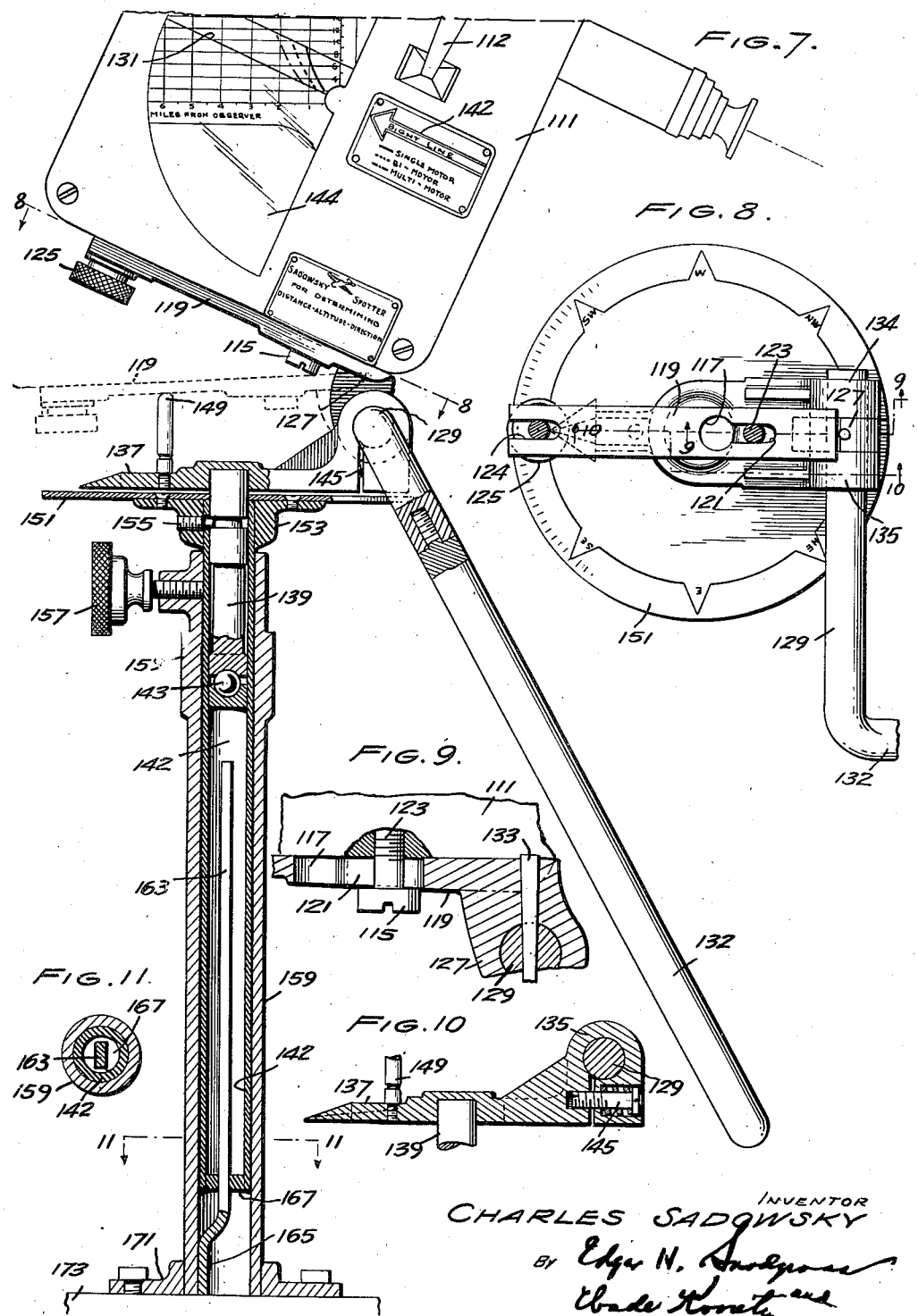

Patented Nov. 9, 1943

2,333,678

UNITED STATES PATENT OFFICE 2,333,678

AIRPLANE SPOTTER

Charles Sadowsky, New York, N. Y.

Application September 7, 1942, Serial No. 457,637

12 Claims. (Cl. 33—71)

(Granted under the act of March 3, 1883, as amended April 30, 1928; 370 O. G. 757)

The invention described herein may be manufactured and used by or for Government for governmental purposes, without the payment to me of any royalty thereon.

This invention relates to measuring instruments, and particularly to an instrument for use in estimating the altitude of an airplane in flight and its distance from the observer; and, preferably, also for giving its direction or compass bearing with respect to the observer at the time the airplane is sighted through the instrument.

The principal object of the invention is to provide in a single simple instrument means for aiding an observer to estimate both the altitude and distance of an airplane in flight; and a further object is to include means operated by the sighting of the instrument for giving the direction of the sighted airplane with respect to the observer.

The invention comprises the assembled cooperating means hereinafter described, and illustrated in the accompanying drawings showing a preferred embodiment thereof and a modification and in which:

Fig. 4 is a side elevation of the instrument of Fig. 1 showing the parts thereof in one operative or spotting position;

Fig. 5 is a top plan view of the direction indicator of Figs. 1 and 4; and

Fig. 6 is a perspective view of the gauge actuated indicator plate, bearing the curve or series of curves by which the observer reads the instrument to estimate both distance and altitude.

Fig. 7 is a view in side elevation, partly in section, of an airplane spotting instrument embodying the invention and provided with a modified casing and instrument support;

Fig. 8 is a horizontal sectional view taken on line 8—8 of Fig. 7;

Fig. 9 is a fragmentary vertical sectional view, on an enlarged scale, taken on line 9—9 of Fig. 8;

Fig. 10 is a fragmentary vertical sectional view taken on line 10—10 of Fig. 8; and Fig. 11 is a horizontal sectional view through the support taken on line 11—11 of Fig. 7.

Figure 1:
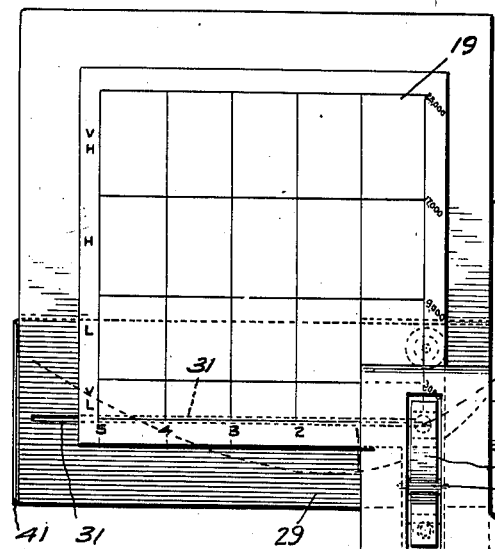
Fig. 1 is a side elevation, partly in section, showing an airplane spotting instrument or estimator embodying the invention.

Referring first particularly to Figs. 1 and 4, the instrument is provided with a support in the form of a handle 11, which includes the two spaced plates 13 and 15, between which depends the pendulum 17 of the scale plate 19 pivotally mounted on the handle at 21. A counterweight 23 fixed to the bottom of the pendulum insures that the scale plate 19 will remain in the position of Figs. 1 and 4 during sighting operation of the instrument as hereinafter described.

The scale plate 19 is made of transparent material, and is marked off horizontally into height zones as shown in Figs. 1 and 4. These zones may conveniently be the commonly accepted altitude zones customarily referred to by airplane spotters in estimating the altitude of a plane in flight as very high, high, low and very low. In accepted standard practice the very low zone is from 0 to 3,000 feet, the low zone from 3,000 to 9,000 feet, the high zone from 9,000 to 17,000 feet and the very high zone from 17,000 to 25,000 feet and higher, and the scale plate 19 is accordingly shown as being so marked.

In addition to being marked off by horizontal lines into height zones the transparent scale plate 19 is marked off vertically at equal intervals into distance zones, these vertical lines corresponding to distances, in the present example, of one, two, three, four and five miles. The equal intervals between any two adjacent lines preserves facility of distance estimation as the distance of the sighted airplane increases.

Figure 2:
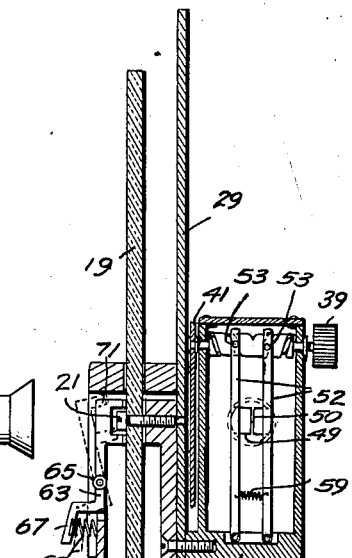
Fig. 2 is a vertical transverse sectional view taken on line 2—2 of Fig. 1.

A reading plate 29, (Figs. 1, 2 and 4), preferably opaque, is secured to the outside face of handle plate 15, in fixed relation thereto, and is provided with the narrow reading slot 31 extending horizontally thereacross as viewed in Fig. 1, this slot being visible through the pivoted transparent scale plate 19.

Fixed to the outer face of the reading plate 29 is a small casing or housing 35, in the upper portion of which is rotatably mounted a gauge actuating shaft 37 whose ends project from the casing. The outer end of the shaft has fixed to it a knurled knob 39, by which the shaft may be manually rotated through a limited angle. The inner end of the shaft 37 has fixed to it an indicator plate 41 (Fig. 6), so that whatever rotative movement is imparted to the knob will be communicated to the indicator plate, which will thereby be given an equal angular movement.

To an observer looking at the face of the instrument shown in Fig. 1 the portion of the indicator plate 41 exposed by reading slot 31 will be visible through the transparent scale plate 19. An indicator curve is plotted on the indicator plate 41, and that portion of it opposite the reading slot 31 will be visible to the observer, who can then make a distance and altitude estimation reading on the scale plate according to the position where he sees the plotted curve through the reading slot, as hereinafter described.

Angular movement of the indicator plate itself, and consequently of the plotted curve, is dependent on and co-extensive with the angular movement imparted manually to the knurled knob 39, and in the operation of the instrument the knob is given a rotative angular movement in one direction or the other to move toward or away from each other a pair of gauge wires until the sighted plane is exactly included between them.

Figure 3:
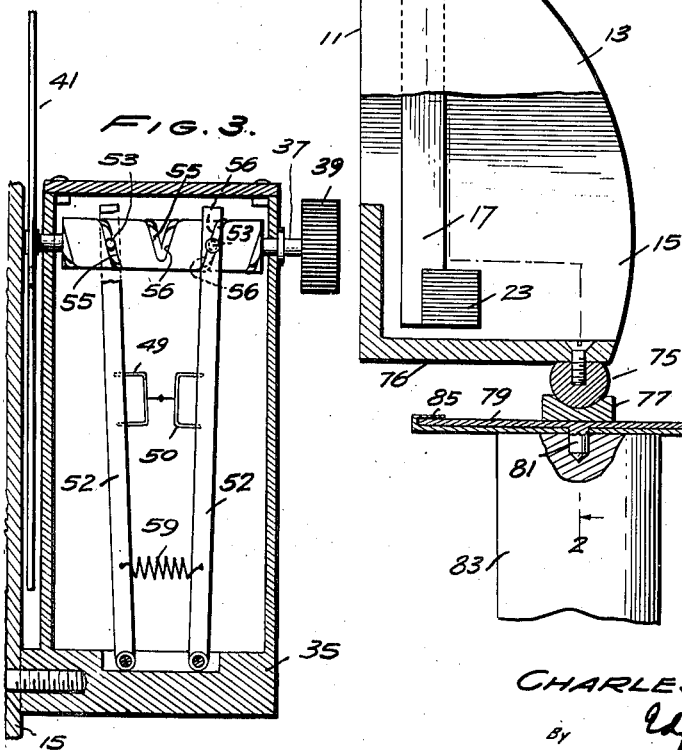
Fig. 3 is a fragmentary view showing on an enlarged scale a different position of the parts of the scissors bar gauge mechanism of Fig. 2.

For the purpose of facilitating this operation, the instrument includes a telescope 45 carried in the housing 35, within whose field of view are two gauge wires 49 and 50 (Figs. 2 and 3) movable toward and away from each other. Each gauge wire is carried by one of a pair of scissors bars 52, whose lower ends are pivotally mounted in the bottom of the casing 35. The upper end of each bar carries a pin 53, by means of which the gauge shaft imparts movement to the scissors bars.

The central enlarged portion of shaft 37, located within the casing 35, is provided with a pair of oppositely threaded pin grooves 55 and 56, extending in opposite directions from its center, and each groove receives one of the pins 53. A coil spring 59 under tension connects the two scissors bars, and acts to urge the scissors bars, and consequently the gauge wires 49 and 50, constantly toward each other. This construction eliminates lost motion of the scissors bar pins in their grooves, and insures smooth action when the knob 39 is actuated.

Referring now more particularly to the indicator curve on the indicator plate 41, it will be understood that the operator of the instrument sights a plane through the telescope, and operates knob 39 to move the gauge wires 49 and 50 so that the sighted plane is exactly included between them. In sighting the airplane, the handle 11, telescope 45 and slotted reading plate are tilted to some position such as that shown in Fig. 4. Except for such movement as may be imparted to it by operation of knob 39, the indicator plate 41 is tilted or moved through the same angle as the slotted reading plate 29. Operation of the knob 39 to include the spotted plane exactly between the gauge wires will rock the indicator plate correspondingly, so that its net angular movement may be greater or less than the angular movement of the instrument handle 11 and the reading plate 29. In the position of Fig. 4 the net angular movement of the indicator plate is somewhat less than that of the reading plate.

For the purpose of estimating the distance and altitude of an airplane for air raid warning service, mathematical exactness is not required; it is sufficient if the distance be estimated in miles and the altitude in one of four height zones. Moreover, for spotting purposes, airplanes may be classified roughly into size groups, for example, groups having wing spreads of the order of 40 feet, 60 feet and 80 feet. With practice it is possible, on sighting an airplane through the telescope to classify it as falling within one or another size group.

For illustration, suppose it is desired to plot on the indicator plate 41 an indicator curve for use in the instrument in estimating the distance and altitude of an airplane in the 60 foot class.

To avoid crowding of the distance indicating lines at the far end of the scale, and facilitate estimations at the greater distance for which the instrument is calibrated, it is preferred to plot the curve by making a series of observations on an object of known width at distances corresponding to those indicated on the transparent scale plate 19. As before stated the mile spaces between the vertical distance scale lines are equal.

Each indicator curve may be plotted for its width class by sighting an object of convenient width, representing, for example, the 60 foot class, at successive distances bearing the same relation to miles as the width of the sighted object bears to 60 feet. For example, if an object three feet wide is viewed at one twentieth of a mile through the telescope, and the knob 39 is rotated until the object is exactly included between the gauge wires, a point of the indicator curve may be plotted that represents a 60 foot wide airplane a mile away. Operation of the knob positions the indicator plate, and that portion of it visible through the narrow reading slot opposite the 1 mile distance line on the scale is marked. Similar marks are made in a similar manner for the 1½ mile point, 2 mile point, and so on, and a continuous curve drawn through the marked points.

For simplicity of illustration, only one indicator curve has been shown in the drawings, but it will be understood that similar curves may be plotted for making distance and altitude estimates of objects in the 40 foot wide class, the 80 foot wide class, and others as desired. Such a 40 foot class indicator curve would be similar to the 60 foot class indicator curve, and appear above it on the indicator plate. The 80 foot class curve would be similar to the 60 foot curve and be below it on the indicator plate.

It is evident that additional curves may be added to give the instrument the desired degree of refinement. For example, there may be three curves for use with airplanes in each width class, representing the apparent airplane width when the plane is viewed head-on or directly from the rear, sideways, and at an intermediate angle. The utility of the instrument as an estimator, however, is not dependent on such refinements; for usual airplane spotting work for air raid warning service, satisfactory estimates of distance and altitude can be made with only one curve for each selected airplane width class, such as the 40, 60 and 80 foot width classes mentioned.

The invention provides means for clamping the transparent scale plate 19 in the angular position it occupies with respect to the handle 11 at the time an airplane is gauged by the operator while observing it through the telescope 45. This permits the observer to remove his eye from the eyepiece and read off from the instrument the estimated distance and altitude without change of the angular relation of the instrument parts as they existed at the moment the observed plane was gauged between the gauge wires.

To insure continuance of this angular relation while estimate readings are being taken, a clamping lever 63 is pivoted at 65 in a slot provided for it in the handle plate 13. The lower end of the lever is formed with a thumb or finger piece 67, urged constantly away from the handle plate by a coil spring 68 under compression between the thumb piece and the plate. The other end of the lever extends inwardly of the handle plate 13 and is provided with a clamping end 71 for frictional grip on the scale plate under pressure of the coil spring 68.

In operating the device the observer grasps the handle 11 in his left hand, depressing the thumb piece 67, thereby releasing the scale plate from clamped position and permitting it to swing freely on its pivot with respect to the handle. With the right hand the observer manipulates the telescope and gauges the observed airplane by operating knob 39. The parts of the instrument will then be in some such position as that shown in Fig. 4. The instant the observed plane is gauged, the lever 63 is released, and its clamping end bears with spring pressed frictional grip on the scale plate 19. The operator may then cease holding the instrument handle in position to maintain the observed angle of elevation, remove his eye from the telescope eye piece, face the scale plate and make his reading. In the position of the parts as they are shown in Fig. 4, the distance reading is 4 miles and the plane is in the high zone, the reading being taken on the scale plate at the place where the appropriate indicator curve crosses the reading slot.

In connection with the instrument handle 11, and operated by it, while an airplane is being observed and gauged, the invention provides means for showing the direction of the line of sight from the observer to the plane. As shown in Figs. 1, 4 and 5, this means includes the cylindrical bearing 75 secured to the bottom 76 of the handle 11 connecting the two handle plates 13 and 15. In making an observation, the operator of the instrument, grasping it by the handle, rests the instrument bearing 75 in the semi-cylindrical saddle bearing 77 centrally mounted on the upper face of a rotatable direction disc 79. The disc is provided with a vertically dependent pivot pin 81 rotatably mounted in a support 83. The pivot pin passes rotatably through a fixed reference pointer plate 84 secured to the upper face of the support 83, sufficiently spaced below the direction disc 79 to permit free rotation of the latter, and provided with the fixed pointer 85 bent over the direction disc.

The direction disc may be marked off into any desired direction indicating symbols. For example, and as shown in Fig. 5, it may have customary compass symbols lettered about its periphery. In the position of Fig. 5, if the instrument is rested in the saddle bearing with the telescope looking in the direction from the bearing toward the fixed pointer 85, the instrument will be pointing north if the support 83, pointer and pointer plate have been so set up. If from this position the operator in observing and gauging an airplane moves the handle 11 clockwise 45°, the moving handle will move the direction disc a corresponding 45° clockwise, so that the disc reading taken at the fixed pointer will be N. E., which is the direction of the plane from the observer's station at the moment of setting the instrument for reading the estimated height and distance.

Referring now to Figs. 7 to 11 inclusive, a rectangular casing 111 is provided in place of the handle 11 of Fig. 1 and serves as a support for the plates, telescope, and housing 35; the clamping lever 63 is omitted; and in place of the narrow slot 31 in the reading plate 29 a relatively wide reading slot 131 (Fig. 7) is provided, through which the indicator curve or curves on the indicator plate 141 may be read along the line defining the bottom of the slot, as directed by the arrow 142 provided on the outside of the casing and marked "Sight line." In this example of the invention three size-class indicator curves are shown, representing airplanes having a single motor, two motors, and more than two motors, and the curves may be plotted for airplanes in the over-all size classes of forty, sixty and one hundred feet. Readings are made through a glass window 144 provided in the casing. A handle 112 is provided on the casing 111, and a different form of mounting and support are employed. With the above exceptions the construction is the same as that already described in connection with Figs. 1 to 6 inclusive.

In the present example of the invention the instrument is provided with a frictional grip mounting and an operating handle by means of which the operator, with his left hand, moves the instrument in different directions and to different angles of elevation. The instrument casing 111 is preferably provided with means by which it may be readily mounted on and removed from a tilting and rotatable support.

For this purpose, the bottom of the casing is provided with a downwardly projecting cylindrically headed machine screw 115 fixed in the casing. The head of the screw is receivable in a circular opening 117 provided for it in a tilting head plate 119. A machine screw neck receiving slot 121 opens into the circular opening 117, and in mounted position of the casing receives the neck 123 of the machine screw 115. The bottom of the head plate is slightly sloped with respect to its top, so that where the machine screw fits in it, the plate increases in thickness toward its pivot, thus providing a wedge holding grip for the casing in its mounted position by movement of the casing on the head plate toward the head plate pivot.

The outer end of the head plate 119 is forked at 124 as shown in Fig. 8, for the reception of the neck of the manually operable knurled clamping screw 125, which slides back in the fork as the casing is slid rearwardly along the tilting head to its wedge grip mounted position thereon, in which position the clamping screw 125 may be tightened. Assembly and dis-assembly of the casing with respect to the tilting head may thus be simply and quickly effected.

As shown in Fig. 9, the inner end of the tilting head is formed with the boss 127 provided with an opening to receive the shaft portion 129 of a bar handle 132, which shaft portion and boss are secured together in fixed relation as by the pin 133.

The shaft portion 129 of handle 132 is mounted in a pair of bearings 134 and 135 formed on the inner end of a direction pointer 137, which is fixed on the top of a downwardly extending short shaft 139 rotatably mounted in a vertically movable sleeve 142 and resting on a single ball center bearing 143 within the sleeve.

The shaft bearing 135 (Fig. 10) is split and provided with a bearing friction grip adjusting screw 145, which may be tightened or loosened in known manner to vary the grip of the split bearing on the shaft. In practice the screw is so adjusted as to provide a grip that will maintain the casing 111 in the tilted position to which it is brought in sighting or spotting an airplane as hereinbefore described. The construction permits the spotter to release the handle and the entire instrument with assurance that its angle of elevation at which an airplane is observed will be maintained by the friction grip while the reading is being made.

In the normal or substantially level position of the tilting head 119, as indicated by the dotted lines in Fig. 7, the head rests upon a vertical supporting pin 149 fixed on the forward part of the direction pointer 137.

As shown in Figs. 7 and 8, the direction pointer 137 is rotatable with the instrument casing 111 over a circular disc 151 bearing compass direction markings. The disc 151 is fixed to a head 153 secured to the sleeve 142 by a screw pin 155, whose inner end, as shown in Fig. 7, projects through the sleeve and into a neck or groove in the rotatable vertical shaft 139 carrying the direction pointer arm 137.

Thus by loosening set screw 157 in the mounting tube 159 the entire instrument may be raised or lowered to convenient spotting height with respect to the mounting tube, and the casing 111 and pointer will remain in rotatable assembled relation, upon tightening the set screw.

Means are provided to prevent rotation of the sleeve 142 with respect to the mounting tube 159. As shown in Figs. 7 and 11, a flat bar 163 has its lower end 165 fixed within the mounting tube, and its upper end projecting through a slot provided in the bottom closure 167 of the sleeve to receive the bar slidably but non-rotatably.

A bottom flange 171 is provided on the lower end of the mounting tube 159, by which the tube may be fixed to any suitable support 173 in properly oriented position of the disc 151, which is movable vertically but non-rotatably with respect to the mounting tube, being fixed to the sleeve 142.

The operations of spotting an airplane and reading the instrument are as already described, except that in the embodiment of Fig. 7 the direction pointer is moved with respect to a fixed scale, and the long bar handle and friction grip facilitate the operations of tilting the casing and making the readings.

The instrument of the present invention thus provides for giving readings of distance, altitude and direction. Due to the pivotal mounting of the scissors bars, the gauge wires 49 and 50 do not remain parallel while being moved toward and away from each other. The deviation from true parallel, however, is very small, and in practice is negligible. Moreover this tolerable deviation permits the described scissors bar mounting, which provides desired smooth scissors bar action without lost motion.

What is claimed is—

1. An airplane spotting estimator instrument comprising a support, and means for estimating altitude and distance, including a transparent scale plate pivotally and pendulously carried by the support and bearing altitude and distance markings, an opaque reading plate fixedly carried by the support behind said scale plate and having a reading slot therein extending across said scale plate, an indicator plate bearing airplane size-class markings and pivotally carried by the support behind said reading plate slot, and apparent size gauging means carried by the support and connected to the indicator plate for moving it during size-gauging operation proportionately to the range.

2. An airplane spotting estimator instrument comprising a handle, means for estimating altitude and distance, including a transparent scale plate pivotally and pendulously carried by the handle and bearing altitude and distance markings, an opaque reading plate carried by the handle behind said scale plate and having a reading slot therein extending across said scale plate, an indicator plate bearing airplane size-class markings and pivotally carried by the handle behind said reading plate slot, apparent size gauging means carried by the handle and connected to the indicator plate for moving it during size-gauging operation proportionately to the range, and direction indicating means including a rotatably supported direction disc having a handle rest to receive the instrument handle and angularly movable to indicate direction by horizontal angular movement of said handle.

3. An airplane spotting estimator instrument comprising a support, means carried by the support for estimating altitude and distance including a transparent scale plate pivotally and pendulously carried by the support and bearing altitude and distance markings, an opaque reading plate fixedly carried by the support behind said scale plate and having a reading slot therein extending across said scale plate, an indicator plate bearing airplane size-class markings and pivotally carried by the support behind said reading plate slot, and apparent size gauging means carried by the support including a pair of gauge wires, and a gauge actuating shaft for moving said gauge wires toward and away from each other, said shaft being connected to the indicator plate for moving it angularly behind said reading slot during gauging operation proportionately to the range.

4. An airplane spotting estimator instrument comprising a support, means carried by the support for estimating altitude and distance including a transparent scale plate pivotally and pendulously carried by the support and bearing altitude and distance markings, an opaque reading plate fixedly carried by the support behind said scale plate and having a reading slot therein extending across said scale plate, an indicator plate bearing airplane size-class markings and pivotally carried by the support behind said reading plate slot, and apparent size gauging means carried by the support including a pair of pivoted scissors bars, a gauge wire carried by each scissors bar, a manually operable gauge actuating shaft having oppositely grooved pin-receiving portions each having a pin connected to a scissors bar for moving the gauge wires toward and from each other on rotative movement of said shaft, said shaft being connected to the indicator plate for moving it angularly behind said reading slot during gauging operation proportionately to the range.

5. An airplane spotting estimator instrument comprising a support, means carried by the support for estimating altitude and distance including a transparent scale plate pivotally and pendulously carried by the support and bearing altitude and distance markings, an opaque reading plate fixedly carried by the support behind said scale plate and having a reading slot therein extending across said scale, an indicator plate bearing airplane size-class markings and pivotally carried by the support behind said reading plate slot, apparent size gauging means carried by the support including a pair of gauge wires, a gauge actuating shaft, and means controlled by the shaft for moving said gauge wires toward and away from each other, said shaft being connected to the indicator plate for moving it angularly behind said reading slot during gauging operation proportionately to the range, and a telescope carried by the support including said gauge wires within its field of view.

6. An airplane spotting estimator instrument comprising a support, and means for estimating altitude and distance including a transparent scale plate pivotally and pendulously carried by the support and having a weighted member maintaining it in upright position during tilting of the support, said scale plate bearing a series of altitude zone markings and a series of equal-intervaled numerically successive distance unit markings, an opaque reading plate fixedly carried by the support behind said scale plate and having a reading slot therein extending across said scale plate, an indicator plate bearing airplane size-class markings and pivotally carried by the support behind said reading plate slot, apparent size gauging means carried by the support including a pair of gauge wires, a manually operable gauge actuating shaft, means controlled by the shaft for moving said gauge wires toward and from each other, said shaft being connected to the indicator plate for moving it angularly behind said reading slot during gauging operation proportionately to the range, and a telescope carried by the support in fixed angular relation thereto and including said gauge wires within its field of view.

7. An airplane spotting estimator instrument comprising a support, and means for estimating altitude and distance including a transparent scale plate pivotally and pendulously carried by the support and having a weighted member maintaining it in upright position during tilting of the support, said scale plate bearing a series of altitude zone markings and a series of equal intervaled numerically successive distance unit markings, an opaque reading plate fixedly carried by the support behind said scale plate and having a reading slot therein extending across said scale plate, an indicator plate bearing airplane size-class markings and pivotally carried by the support behind said reading plate slot, apparent size gauging means carried by the support including a pair of pivoted scissors bars, each carrying one of a pair of gauge wires, a manually operable gauge actuating shaft, means controlled by the shaft for moving said gauge wires toward and from each other, said shaft being connected to the indicator plate for moving it angularly behind said reading slot during gauging operation proportionately to the range, and a telescope carried by the support in fixed angular relation thereto and including said gauge wires within its field of view.

8. An airplane spotting estimator instrument comprising a handle, and means for estimating altitude and distance including a transparent scale plate pivotally and pendulously carried by the handle and having a weighted member maintaining it in upright position during tilting of the handle, said scale plate bearing a series of altitude zone markings and a series of equal-intervaled numerically successive distance unit markings, an opaque reading plate fixedly carried by the handle behind said scale plate and having a reading slot therein extending across said scale plate, an indicator plate bearing airplane size-class markings and pivotally carried by the handle behind said reading plate slot, apparent size gauging means carried by the handle including a pair of pivoted scissors bars, a gauge wire carried by each scissors bar, a manually operable gauge actuating shaft, means controlled by the shaft for rocking said scissors bars to move said gauge wires toward and from each other, said shaft being connected to the indicator plate for moving it angularly behind said reading slot during gauging operation proportionately to the ranges, and a telescope carried by the handle in fixed angular relation thereto and including said gauge wires within its field of view, and direction indicating means including a rotatably supported direction disc having a handle rest to receive the instrument handle and angularly movable to indicate direction by horizontal angular movement of said handle.

9. An airplane spotting estimator instrument comprising a casing, means carried by the casing for estimating altitude and distance including a transparent scale plate pivotally and pendulously carried in the casing and bearing altitude and distance markings, an opaque reading plate fixedly carried in the casing behind said scale plate and having a reading slot therein extending across said scale plate, an indicator plate bearing airplane size-class markings and pivotally carried in the casing behind said reading plate slot, apparent size gauging means carried by the casing including a pair of gauge wires and a gauge actuating shaft and means controlled by the shaft for moving said gauge wires toward and away from each other, said shaft being connected to the indicator plate for moving it angularly behind said reading slot during gauging operation proportionately to the range, a tilting head plate supporting said casing, means for maintaining said head plate in tilted position, and means associated therewith for indicating the direction of a spotted airplane comprising a pivoted direction indicator carrying said tilting head plate, a direction disc for said pivoted indicator, and means for mounting said disc securing it against rotational movement.

10. An airplane spotting estimator instrument comprising a casing, means carried by the casing for estimating altitude and distance including a transparent scale plate pivotally and pendulously carried in the casing and bearing altitude and distance markings, an opaque reading plate fixedly carried in the casing behind said scale plate and having a reading slot therein extending across said scale plate, an indicator plate bearing airplane size-class markings and pivotally mounted in the casing behind said reading plate slot, apparent size gauging means carried by the casing including a pair of pivoted gauge wires, a gauge actuating shaft and means controlled by the shaft for rocking said gauge wires toward and from each other, said shaft being connected to said indicator plate for moving it angularly behind said reading slot during gauging operation proportionately to the range, a telescope fixedly mounted on the casing and including said gauge wires within its field of view, a tilting head plate supporting said casing, means for frictionally holding said head plate in tilted position, and means associated therewith for indicating the direction of a spotted airplane comprising a direction indicator carrying said tilting head plate, a vertically adjustable sleeve pivotally supporting said direction indicator, means for guiding said sleeve in vertical, rectilinear non-rotative movement, means for securing said sleeve in vertically adjusted position, and a direction disc having compass markings fixedly carried by said sleeve below said direction indicator.

11. An airplane spotting estimator instrument comprising a casing, means for estimating altitude and distance including a transparent scale plate pivotally and pendulously carried in the casing and having a weighted member maintaining it in upright position during tilting of the casing, said scale plate bearing a series of altitude zone markings and a series of equal-intervaled numerically successive distance unit markings, an opaque reading plate fixedly mounted in the casing behind said scale plate and having a reading slot therein extending across said scale plate, an indicator plate bearing a series of different airplane size-class markings and pivotally carried in the casing behind said reading plate slot, apparent size gauging means carried by the casing including a pair of pivoted scissors bars, each carrying one of a pair of pivoted gauge wires, a manually operable gauge actuating shaft and means controlled by the shaft for moving said gauge wires toward and away from each other, said shaft being connected to the indicator plate for moving it angularly behind said reading slot during gauging operation proportionately to the range, a telescope carried by the casing in fixed angular relation therewith and including said gauge wires within its field of view, a tilting head plate supporting said casing, means for indicating the direction of a spotted airplane including a direction indicator having bearings for tiltably mounting and frictionally holding said tilting head plate, a vertically adjustable sleeve pivotally supporting said direction indicator and fixedly carrying a direction marked disc in proximity thereto, means for guiding said sleeve in vertical rectilinear non-rotative movement, and means for securing said sleeve in vertically adjusted position.

12. An airplane spotting estimator instrument comprising a casing, means for estimating altitude and distance including a transparent scale plate bearing altitude and distance markings pivotally and pendulously mounted in the casing and having a weighted member maintaining it in upright position during tilting of the casing, an opaque reading plate fixedly carried in the casing behind said scale plate and having a reading slot therein extending across said scale plate, an indicator plate bearing a series of airplane size-class markings pivotally mounted in the casing behind said reading plate slot, manually operable apparent size-gauging means carried by the casing and connected to the indicator plate for moving it during gauging operation proportionately to the range, a telescope fixedly mounted on the casing and including said size-gauging means within its field of view, a tilting head for supporting said casing, means for indicating the direction of a spotted airplane including a direction indicator having bearings for tiltably mounting and frictionally holding said tilting head, a shaft member rockably mounted in said bearings and having said tilting head fixed thereto, a bar handle for rocking said shaft to tilt the head and casing, means pivotally supporting said indicator and a direction marked disc fixedly carried thereby in proximity to said indicator.

CHARLES SADOWSKY.